(12) United States Patent
Aviv et al.

(10) Patent No.: US 8,823,777 B2
(45) Date of Patent: Sep. 2, 2014

(54) REAL-TIME DEPTH EXTRACTION USING STEREO CORRESPONDENCE

(75) Inventors: Ziv Aviv, Bat Hefer (IL); Omri Govrin, Pardes-Hana-Karkur (IL)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 13/075,428

(22) Filed: Mar. 30, 2011

(65) Prior Publication Data

US 2012/0249747 A1      Oct. 4, 2012

(51) Int. Cl.
| H04N 13/02 | (2006.01) |
| G06T 7/00 | (2006.01) |
| G06K 9/00 | (2006.01) |
| H04N 13/00 | (2006.01) |

(52) U.S. Cl.
CPC .. *H04N 13/0018* (2013.01); *G06T 2207/20021* (2013.01); *H04N 2013/0081* (2013.01); *H04N 13/0239* (2013.01); *G06T 7/0075* (2013.01)
USPC ............................................ 348/47; 382/154

(58) Field of Classification Search
USPC ......................................................... 348/47
See application file for complete search history.

(56) References Cited

U.S. PATENT DOCUMENTS

| 5,867,591 | A * | 2/1999 | Onda ............................. 382/154 |
| 7,194,126 | B2 * | 3/2007 | Konolige ....................... 382/154 |
| 7,426,319 | B2 * | 9/2008 | Takahashi ..................... 382/294 |
| 8,036,495 | B2 * | 10/2011 | Takeshima et al. ........... 382/299 |
| 8,223,247 | B2 * | 7/2012 | Inoue et al. ................... 348/340 |
| 8,290,244 | B2 * | 10/2012 | Ha ................................. 382/154 |
| 2007/0047040 | A1 * | 3/2007 | Ha ................................. 359/24 |
| 2010/0118125 | A1 * | 5/2010 | Park ............................... 348/46 |
| 2010/0309289 | A1 * | 12/2010 | Chen et al. .................... 348/46 |
| 2010/0309292 | A1 * | 12/2010 | Ho et al. ........................ 348/47 |
| 2010/0328432 | A1 * | 12/2010 | Tanaka .......................... 348/46 |
| 2012/0127275 | A1 * | 5/2012 | Von Zitzewitz et al. ....... 348/46 |
| 2012/0327189 | A1 * | 12/2012 | Muramatsu et al. ........... 348/46 |

FOREIGN PATENT DOCUMENTS

| KR | 10-2010-0065037 A | 6/2010 |
| WO | 2012135220 A2 | 10/2012 |
| WO | 2012135220 A3 | 1/2013 |

OTHER PUBLICATIONS

Farneback, Gunnar, "Polynomial Expansion for Orientation and Motion Estimation", Linkoping Studies in Science and Technology. Dissertations No. 790, ISBN 91-7373-475-6, Nov. 2002, 196 pages.
International Search Report and Written Opinion received for PCT application No. PCT/US2012/030744, mailed on Oct. 29, 2012, 9 pages.
International Preliminary report on Patentability received for PCT Patent Application No. PCT/US2012/030744, mailed on Oct. 10, 2013, 6 pages.

* cited by examiner

*Primary Examiner* — Sath V Perungavoor
*Assistant Examiner* — Howard D Brown, Jr.
(74) *Attorney, Agent, or Firm* — Jordan IP Law, LLC

(57) ABSTRACT

Systems and methods may provide for determining a one-dimensional (1D) disparity between a plurality of rectified images, and extracting depth information from the plurality of rectified images based at least in part on the 1D disparity. In one example, the 1D disparity is in the horizontal direction and the images are rectified with respect to one another in the vertical direction.

19 Claims, 3 Drawing Sheets

FIG. 2
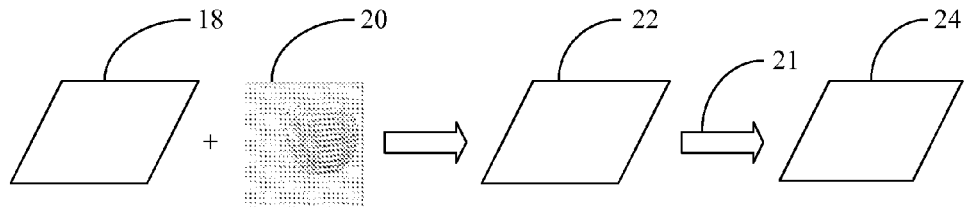
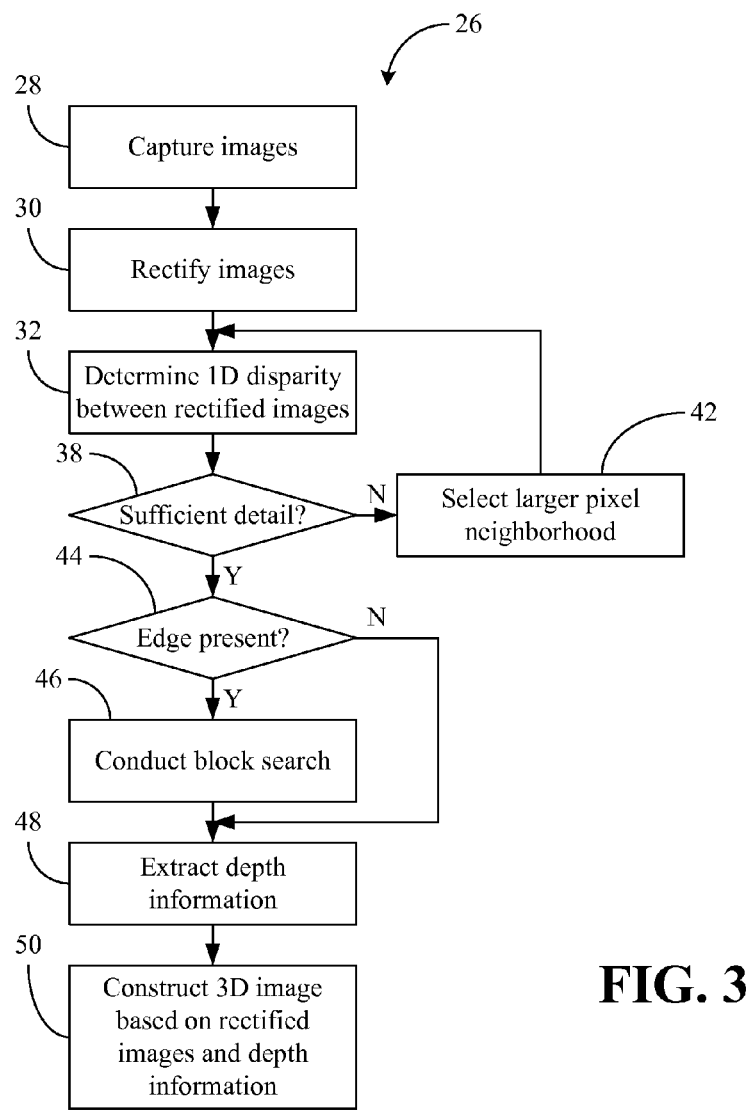
FIG. 3

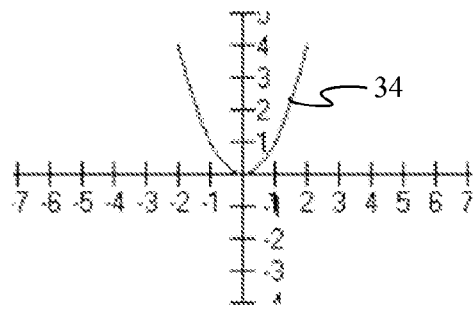
FIG. 4A
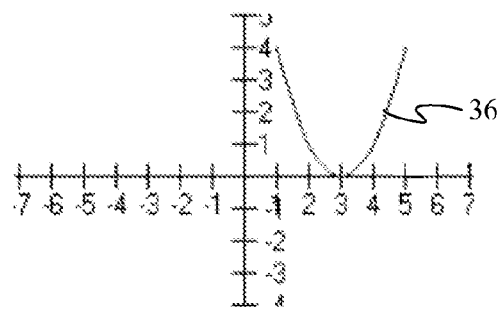
FIG. 4B
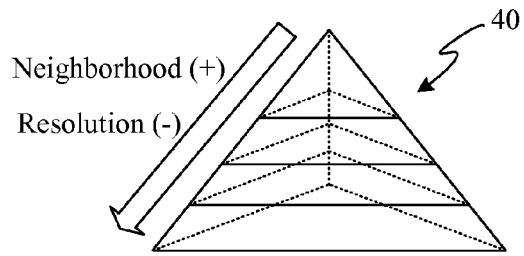
FIG. 5
FIG. 6
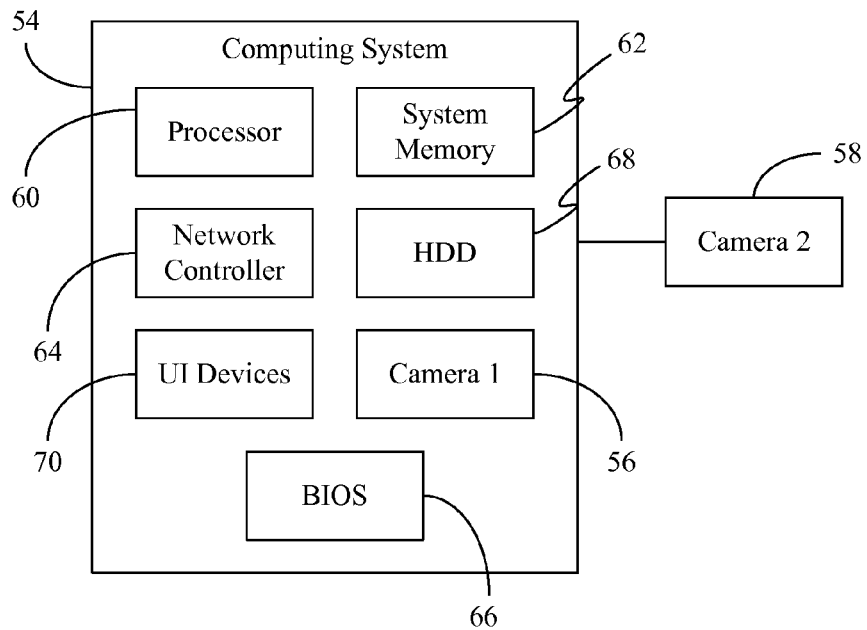

REAL-TIME DEPTH EXTRACTION USING STEREO CORRESPONDENCE

BACKGROUND

Depth information can provide an additional dimension to image data, and may be useful in addressing challenges presented by various graphics-related applications such as scene rendering, image/video analysis and interpretation, object detection and recognition, and telepresence detection. Stereo pair photography might be used to extract depth information from a pair of images once pixel-to-pixel correspondence has been established between the images. Conventional techniques to extracting depth information from stereo images, however, can provide non-stable results, could demand high computing power, and may be unsuitable for real-time processing.

BRIEF DESCRIPTION OF THE DRAWINGS

The various advantages of the embodiments of the present invention will become apparent to one skilled in the art by reading the following specification and appended claims, and by referencing the following drawings, in which:

FIG. 2 is a block diagram of an example of a depth information extraction process according to an embodiment;

FIG. 3 is a flowchart of an example of a method of constructing a three-dimensional image according to an embodiment;

FIGS. 4A and 4B are plots of examples of local approximation curves according to embodiments;

FIG. 5 is a block diagram of an example of an image analysis pyramid according to an embodiment; and FIG. 6 is a block diagram of an example of a system according to an embodiment.

DETAILED DESCRIPTION

Embodiments may provide for a computer implemented method in which a one-dimensional disparity is determined between a plurality of rectified images. Depth information may be extracted from the plurality of rectified images based at least in part on the one-dimensional disparity.

Embodiments may also include a computer readable storage medium having a set of instructions which, if executed by a processor, cause a computer to determine a one-dimensional disparity between a plurality of rectified images. The instructions can also cause a computer to extract depth information from the plurality of rectified images based at least in part on the one-dimensional disparity.

Other embodiments can include a system having a first camera to capture a first image, a second camera to capture a second image, and a processor. The system may also have a computer readable storage medium with a set of instructions which, if executed by the processor, cause the system to rectify the first and second images to obtain a plurality of rectified images, and determine a one-dimensional disparity between the plurality of rectified images. The instructions can further cause a computer to extract depth information from the plurality of rectified images based at least in part on the one-dimensional disparity, and construct a three-dimensional image based at least in part on the depth information.

Figure 1A:
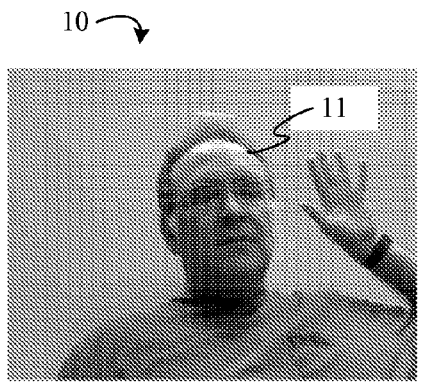
FIGS. 1A-1D are reproductions of examples of images involved in a depth information extraction process according to an embodiment.
Figure 1B:
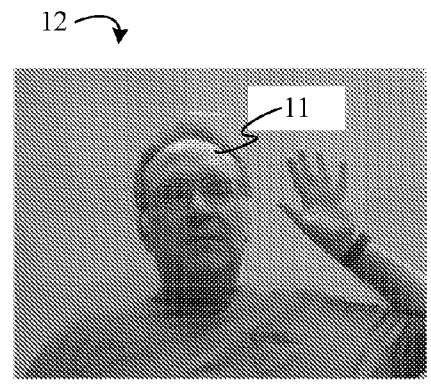
Figure 1C:
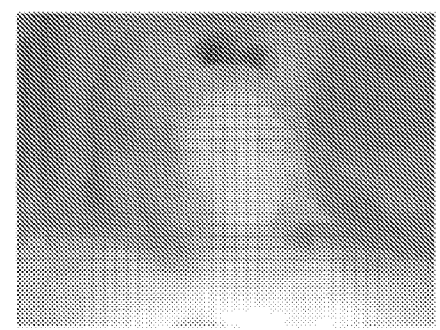
Figure 1D:
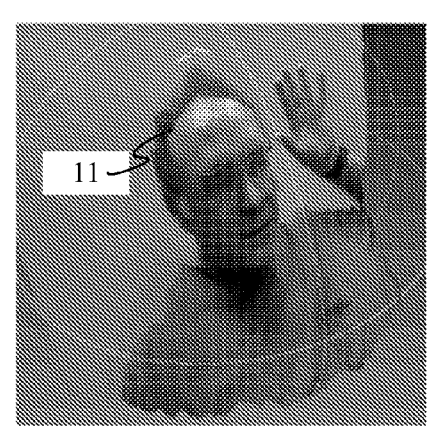

Turning now to FIGS. 1A-1D, an example of the construction of a three-dimensional (3D) image from a plurality of rectified two-dimensional (2D) images is shown, wherein the images could be part of video frame data obtained from a camcorder or other video capture device. In particular, FIG. 1A shows a first image 10 that might be captured using a first camera (e.g., left camera) focused on a subject 11, and FIG. 1B shows a second image 12 that could be captured using a second camera (e.g., right camera) that is also focused on the subject 11, wherein the images 10, 12 may be rectified (e.g., aligned) with respect to one another in the vertical direction. As will be discussed in greater detail, rectifying the images 10, 12 with respect to one another can enable simplified depth extraction and real-time analysis of the images 10, 12. FIG. 1C shows a disparity map 14 that represents the pixel-to-pixel disparity between the images 10, 12. Thus, if the disparity map 14 were to be applied to the first image 10, the result could be the second image 12. FIG. 1D demonstrates that the rectified images 10, 12 and the disparity map 14 may be used to construct a 3D image 16 using various well documented techniques such as triangulation.

FIG. 2 shows a scheme in which a multi-resolutional (e.g., pyramidal) data structure can be used to rapidly detect large disparities (e.g., assess horizontal correspondence) between image. As will be discussed in greater detail, disparity detection can begin at an upper level of a data pyramid (e.g., in which the highest level has the smallest pixel neighborhood and greatest resolution), wherein the disparity determined for a level "n" can be up-sampled and used as an initial estimation for the disparity determination at level n−1. The illustrated scheme shows the pixel data for a left image 18 being combined with a disparity map 20 from a higher level in the pyramid to obtain pixel data for a "warped" version 22 of the left image 18. The illustrated warped version 22 may be corrected along arrow 21 in order to be similar/equivalent to pixel data for a right image 24. The correction of the warped version 22 may be used to account for the use of the disparity map 20 from another level as an initial estimation for the disparity determination at the current level.

Turning now to FIG. 3, a method 26 of constructing 3D images is shown. The method 26 may be implemented in executable software as a set of logic instructions stored in a machine- or computer-readable medium of a memory such as random access memory (RAM), read only memory (ROM), programmable ROM (PROM), firmware, flash memory, etc., in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 26 may be written in any combination of one or more programming languages, including an object oriented programming language such as Java, Smalltalk, C++ or the like and conventional procedural programming languages, such as the "C" programming language or similar programming languages.

Processing block 28 provides for capturing a plurality of images. As already noted, the images could represent video frame data or still image data, and the image capture could be conducted by stereo cameras or other suitable image capture devices. The captured images may be rectified at block 30 with respect to one another in the vertical direction, wherein the rectification process can effectively incorporate the epipolar constrain between the imaging devices. Block 32 provides for determining a one-dimensional (1D) disparity between the images.

In particular, FIGS. 4A and 4B demonstrate that a quadratic polynomial $ax^2$, illustrated in curve 34, may be shifted by a distance (e.g., disparity) "d" to obtain a local approximation formula, $$a(x+d)^2 = ax^2 + 2dax + ad^2 \tag{1}$$

Wherein d is the ratio of the linear term (i.e., 2da) to the quadratic term (i.e., a), and curve 36 shows the local approximation formula for the scenario when d equals three. Thus, the local translation of a 1D quadratic polynomial can be given as, $$p_l = a_l x^2 + b_l x + c_l \tag{2}$$

$$p_r = a_r x^2 + b_r x + c_r = p_l(x+d) = a_l(x+d)^2 + b_l(x+d) + c_l \tag{3}$$

Where $p_l(x)$ is the approximate pixel value at position x in the left image and $p_r(x)$ is the approximate pixel value at position x in the right image. Applying the principle of formula (1) to formula (3) can yield, $$p_r = a_l x^2 + 2a_l dx + d^2 + b_l x + b_l d + c_l \tag{4}$$

Simplifying formula (4) may provide for, $$p_r = a_l x^2 + (2a_l + b_l) x + d^2 + b_l d + c_l \tag{5}$$

Thus, equating the quadratic, linear and constant coefficients of formula (3) to formula (5) yields, $$a_l = a_r \tag{6}$$

$$b_r = 2a_l d + b_l \tag{7}$$

$$c_r = d^2 + b_l d + c_l \tag{8}$$

Solving formula (7) for disparity d therefore yields, $$d = \frac{b_r - b_l}{2a_l} \tag{9}$$

The determination of the local polynomial $a_l$ may be given by, $$a_l(x, y) = \sum_{ij} g(i)g(j)|l\_img_{xx}(x+i, y+j)| \tag{11}$$

Where g is a Gaussian filter and $l\_img_{xx}$ is the second horizontal derivative for the left image. Although the pixel neighborhood is 2D, the determination can be limited to the horizontal pixel neighborhood because the translation is only horizontal. Moreover, the sign of the left image second horizontal derivative may be disregarded and taken into account in the estimation of the linear coefficient below. The estimation of the local polynomial coefficients $b_r - b_l$ can be made by estimating their difference "db".

$$db(x,y) = \text{SIGN}(l\_img_{xx}) * (l\_img_x(x,y) - r\_img_x(x,y)) \tag{12}$$

Where $l\_img_x$ is the first horizontal derivative for the left image and $r\_img_x$ is the first horizontal derivative for the right image. Therefore, $$b_l(x, y) - b_r(x, y) = \sum_{ij} g(i)^* g(j)^* db(x+i, y+j) \tag{13}$$

$$d = \frac{b_l(x, y) - b_r(x, y)}{2a_l} \tag{14}$$

Formula (14) can provide a robust interpolation of the disparity between the rectified images and is particularly useful when the initial value of d is not zero. Additionally, an update scheme for formula (14) may be deployed, $$db(x,y) = \text{SIGN}(l\_img_{xx}) * (l\_img_x(x,y) - r\_img_x(x+d(x,y),y)) + d(x,y)*l\_img_{xx} \tag{15}$$

Returning now to FIG. 3, block 38 provides for determining whether the chosen pixel neighborhood contains sufficient detail. In particular, optimal neighborhood size may depend on local content. Gray value levels of small neighborhoods might be almost constant, making the correspondence determination more challenging. If the neighborhood is almost constant, however, the absolute value of the quadratic coefficient will be very small and can therefore provide a simple criterion to use the disparity calculated at lower resolution levels.

For example, FIG. 5 shows a data pyramid 40 that increases in pixel neighborhood size and decreases in resolution as to lower levels of the pyramid 40 are selected. Thus, if the local polynomial coefficient $a_l$ in formula (14) becomes very small, an assumption might be made that the chosen pixel neighborhood contains insufficient detail and a larger pixel neighborhood may be selected. In such a case, a value of d may be obtained at a lower resolution of the pyramid 40.

$$d = \begin{cases} \dfrac{b_l(x, y) - b_r(x, y)}{2a_l}; & a_l > constant \\ d = d; & a_l < constant \end{cases} \tag{16}$$

It is possible to use other estimations for $a_l$ such as Gaussian averaging of the squares of the second derivative.

Returning again to FIG. 3, if it is determined that the pixel neighborhood has insufficient detail, block 42 provides for selecting a larger pixel neighborhood, wherein the determination of the 1D disparity may be repeated using the disparity from the previous estimate as the initial value.

If the pixel neighborhood has sufficient detail, block 44 provides for determining whether one or more edges are present in the pixel neighborhood. In one example, the edge may be detected by comparing the second derivative of one of the images (e.g., $l\_img_{xx}$) to a certain threshold. If the threshold is exceeded the existence of an edge may be inferred. If an edge is present, a block search of the pixel neighborhood may be conducted at processing block 46 in order to refine the 1D disparity. In particular, the right image may be wrapped with the disparity as indicated in the following expression, $$wr\_img(x,y) = r\_img(x+d(x,y),y) \tag{17}$$

Where wr_img is the wrapped image. The second horizontal and vertical derivatives of the wrapped image, $wr\_img_{xx}$ and $wr\_img_{yy}$, may then be calculated. For a(x,y)>constant, the below formula (18) can be applied to the images and derivatives, $$d(x, y) = \operatorname*{argmin}_{k}\{sadd(l\_img(x, y), \{Wr\_img(x-k, y) \ldots Wr\_img(x+k, y)\})\}$$

and for a(x,y)<constant, the below formula (19) can be applied to the images and derivatives, $$d(x,y) = d(x,y)$$

Wherein the notation "sadd" represents the sum of absolute differences, the notation "arg min" represents the index of the minimal value of the set, and $$sadd(1\_img(x_l, y_r), Wr\_img(x_r, y_r)) = \qquad (20)$$

$$\sum_{\substack{i\geq -2 \\ j\geq -1}}^{\substack{i\leq 2 \\ j\leq 1}} (|1\_img_{xx}(x_l + i, y_r + j) - Wr\_img_{xx}(x_l + i, y_r + j)| +$$

$$|1\_img_{yy}(x_l + i, y_r + j) - Wr\_img_{yy}(x_l + i, y_r + j)|$$

The above formula (20) may be refined to use only the vertical or the horizontal derivative.

Once the refinement of the 1D disparity is complete, illustrated block 48 extracts depth information from the plurality of rectified images based at least in part on the 1D disparity. Processing block 50 may provide for constructing a 3D image based on the rectified images and the depth information.

An example of pseudo code for accomplishing the techniques described herein is shown below.

```
Build up sampled Gaussian pyramid for both images 1_image
and r_image.
Level N is the highest level and level 0 is the original image
Iterate on level in pyramids:
    Up sample disparity found in previous level n−1 to form
    current disparity
    For both images:
    Calculate first and second derivative using separable convolution.
        rdy, rddy ldy and lddy are vertical first and second derivatives
        of left and right images.
        rdx, rddx ldx and lddx are horizontal first and second derivatives
        of left and right images.
(Horizontal polynomial approximation to estimate d)
For right image only
Calculate Gaussian averaging of absolute value of rddx (garddx)
Calculate Gaussian averaging of square value of rddx (gsrddx)
Iterate on right image at level n
    Wrapped left image derivative (ldx) by d to obtain sl_dx (Wrapping
    is on horizontal line only because images are rectified)
    Subtract sl_dx from right image derivative: Del = rdx − sl_dx
    Add normalized motion to Del, Del = Del + rddx*d
    Filter Del *
    Gaussian filtering of normalized Del
    (If region doesn't contain detail use disparity found at higher levels)
    if(gsrddx > threshold)
        update d, d = Del / garddx
end iterate
(Block matching)
    Wrap left image by d to obtain left_image_wrapped
    Calculate second derivative of left_image_wrapped
    If(left_image_wrapped > value)*
        Apply block matching between second derivatives of
        both images
        Fixed d
Apply one more Horizontal polynomial approximation to refine d
End of level calculation
```

Turning now to FIG. 6, a platform 52 having a computing system 54 with a processor 60, system memory 62, a network controller 64, BIOS (basic input/output system) memory 66 that might be implemented as a plurality of NAND memory devices or other NVM (non-volatile memory), a HDD (hard disk drive) 68, and UI (user interface) devices 70 such as a display, keypad, mouse, etc. in order to allow a user to interact with and perceive information from the platform 52. The platform 52 could be part of a mobile platform such as a laptop, mobile Internet device (MID), personal digital assistant (PDA), media player, imaging device, etc., any smart device such as a smart phone, smart tablet, smart TV and so forth, or any combination thereof. The platform 52 may also be part of a fixed platform such as a personal computer (PC), server, workstation, game console, etc. Thus, the processor 60 of the computing system 54 may include one or more processor cores and an integrated memory controller (IMC, not shown) configured to communicate with the system memory 62. The system memory 62 could include dynamic random access memory (DRAM) configured as a memory module such as a dual inline memory module (DIMM), a small outline DIMM (SODIMM), etc. The cores of the processor 60 may execute an operating system (OS) such as a Microsoft Windows, Linux, or Mac (Macintosh) OS, and various other software applications, where each core may be fully functional with instruction fetch units, instruction decoders, level one (L1) cache, execution units, and so on.

The illustrated network controller 64 could provide off-platform communication functionality for a wide variety of purposes such as wired communications or wireless communications including, but not limited to, cellular telephone (e.g., W-CDMA (UMTS), CDMA2000 (IS-856/IS-2000), etc.), WiFi (e.g., IEEE 802.11, 1999 Edition, LAN/MAN Wireless LANS), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes.

The illustrated platform 52 also includes a first camera 56 configured to capture images of a subject and a second camera 58 configured to capture images of the subject. The cameras 56, 58 may both be integrated into the computing system 54, both be implemented as peripheral devices, or implemented in a hybrid configuration as shown. In addition, the processor 60 may execute instructions to rectify the images from the cameras 56, 58, determine a 1D disparity between the rectified images, extract depth information from the rectified images based at least in part on the 1D disparity, and construct a 3D image based at least in part on the depth information in real-time, as already discussed.

The techniques described herein may therefore be useful in a wide variety of settings including, but not limited to, game consoles, smart phones, graphic processing unit (GPU) devices, multipurpose central processing unit (CPU) devices, and game engines, to support real-time rendering of 3D images based on stereo correspondence photography. Moreover, many applications including but not limited to gesture recognition, and facial recognition for security and telepresence/video conferencing purposes might be enhanced using the approaches described herein.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections.

In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A system comprising:
a first camera to capture a first image;
a second camera to capture a second image;
a processor;
and a computer readable storage medium including a set of instructions which, if executed by the processor, cause the system to, rectify the first and second images to obtain a plurality of rectified images, determine a one-dimensional disparity between the plurality of rectified images, extract depth information from the plurality of rectified images based at least in part on the one-dimensional disparity, and construct a three-dimensional image based at least in part on the depth information;
wherein the instructions, if executed, cause the system to: identify a pixel neighborhood for the plurality of rectified images, detect an edge in the pixel neighborhood, and conduct a block search to refine the one-dimensional disparity in response to detecting the edge.

2. The system of claim 1, wherein the one-dimensional disparity is to be in a horizontal direction and the first and second images are to be rectified with respect to one another in a vertical direction.

3. The system of claim 2, wherein the instructions, if executed, cause the system to shift a quadratic polynomial of a local approximation formula in the horizontal direction.

4. The system of claim 1, wherein the plurality of rectified images is to include a first rectified image and a second rectified image, and the block search is to: wrap the second rectified image with the one-dimensional disparity to obtain a wrapped image, calculate a second horizontal derivative and a second vertical derivative of the wrapped image, apply a sum of absolute differences formula to the second horizontal derivative, the second vertical derivative, and the first rectified image, and determine a minimum value of the sum of absolute differences formula in the block to obtain a refined disparity.

5. The system of claim 1, wherein the instructions, if executed, cause the system to:
identify a first pixel neighborhood for the plurality of rectified images,
detect that the first pixel neighborhood contains insufficient detail for disparity estimation, and
select a second pixel neighborhood for the plurality of rectified images in response to detecting that the first pixel neighborhood contains insufficient detail, wherein the second pixel neighborhood is to have a greater size than the first pixel neighborhood.

6. A computer implemented method comprising:
determining a one-dimensional disparity between a plurality of rectified images;
and extracting depth information from the plurality of rectified images based at least in part on the one-dimensional disparity;
wherein the instructions, if executed, cause the system to: identify a pixel neighborhood for the plurality of rectified images, detect an edge in the pixel neighborhood, and conduct a block search to refine the one-dimensional disparity in response to detecting the edge.

7. The method of claim 6, wherein the one-dimensional disparity is in a horizontal direction and the images are rectified with respect to one another in a vertical direction.

8. The method of claim 7, wherein determining the one-dimensional disparity includes shifting a quadratic polynomial of a local approximation formula in the horizontal direction.

9. The method of claim 6, wherein determining the one-dimensional disparity includes:
- identifying a pixel neighborhood for the plurality of rectified images;
- detecting an edge in the pixel neighborhood; and
- conducting a block search to refine the one-dimensional disparity in response to detecting the edge.

10. The method of claim 9, wherein the plurality of rectified images includes a first rectified image and a second rectified image, and the block search includes:
- wrapping the second rectified image with the one-dimensional disparity to obtain a wrapped image;
- calculating a second horizontal derivative and a second vertical derivative of the wrapped image;
- applying a sum of absolute differences formula to the second horizontal derivative, the second vertical derivative, and the first rectified image; and
- determining a minimum value of the sum of absolute differences formula in the block to obtain a refined disparity.

11. The method of claim 6, wherein determining the one-dimensional disparity includes:
- identifying a first pixel neighborhood for the plurality of rectified images;
- detecting that the first pixel neighborhood contains insufficient detail for disparity estimation; and
- selecting a second pixel neighborhood for the plurality of rectified images in response to detecting that the first pixel neighborhood contains insufficient detail, wherein the second pixel neighborhood has a greater size than the first pixel neighborhood.

12. The method of claim 6, further including constructing a three-dimensional image based at least in part on the depth information.

13. A non-transitory computer readable storage medium including a set of instructions which, if executed by a processor, cause a computer to: determine a one-dimensional disparity between a plurality of rectified images; and extract depth information from the plurality of rectified images based at least in part on the one-dimensional disparity;
wherein the instructions, if executed, cause the system to: identify a pixel neighborhood for the plurality of rectified images, detect an edge in the pixel neighborhood, and conduct a block search to refine the one-dimensional disparity in response to detecting the edge.

14. The medium of claim 13, wherein the one-dimensional disparity is to be in a horizontal direction and the images are to be rectified with respect to one another in a vertical direction.

15. The medium of claim 14, wherein the instructions, if executed, cause a computer to shift a quadratic polynomial of a local approximation formula in the horizontal direction.

16. The medium of claim 13, wherein the instructions, if executed, cause a computer to:
- identify a pixel neighborhood for the plurality of rectified images;
- detect an edge in the pixel neighborhood; and
- conduct a block search to refine the one-dimensional disparity in response to detecting the edge.

17. The medium of claim 16, wherein the plurality of rectified images is to include a first rectified image and a second rectified image, and the block search is to:
- wrap the second rectified image with the one-dimensional disparity to obtain a wrapped image;
- calculate a second horizontal derivative and a second vertical derivative of the wrapped image;
- applying a sum of absolute differences formula to the second horizontal derivative, the second vertical derivative, and the first rectified image; and
- determine a minimum value of the sum of absolute differences formula in the block to obtain a refined disparity.

18. The medium of claim 13, wherein the instructions, if executed, cause a computer to:
- identify a first pixel neighborhood for the plurality of rectified images;
- detect that the first pixel neighborhood contains insufficient detail for disparity estimation; and
- select a second pixel neighborhood for the plurality of rectified images in response to detecting that the first pixel neighborhood contains insufficient detail, wherein the second pixel neighborhood is to have a greater size than the first pixel neighborhood.

19. The medium of claim 13, wherein the instructions, if executed, cause a computer to construct a three-dimensional image based at least in part on the depth information.

\* \* \* \* \*